Figure 1:
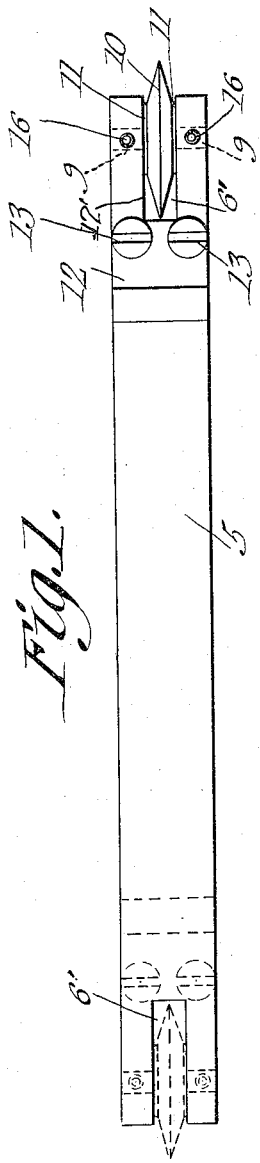

E. E. RICE.
STONE CREASING TOOL.
APPLICATION FILED JUNE 5, 1914.

1,165,022.

Patented Dec. 21, 1915.

Witnesses

E. E. Rice,
Inventor by C. A. Snow & Co.
Attorneys

UNITED STATES PATENT OFFICE.

EDWARD E. RICE, OF PHILADELPHIA, PENNSYLVANIA.

STONE-CREASING TOOL.

1,165,022.  Specification of Letters Patent.  Patented Dec. 21, 1915.

Application filed June 5, 1914. Serial No. 843,292.

*To all whom it may concern:*

Be it known that I, EDWARD E. RICE, a citizen of the United States, residing at Philadelphia, in the county of Philadelphia and State of Pennsylvania, have invented a new and useful Stone-Creasing Tool, of which the following is a specification.

This invention relates to improvements in stone creasing tools and aims to provide a tool which may be inserted into a tool carriage of a lathe and directed against, so as to crease, a stone wheel such as is employed in cutting glass.

A further object is to provide a cutting tool having transversely and longitudinally slotted ends, which are further provided with bearing seats for the reception and rotatable retention of a cutting disk.

Another object is to provide a tool having bearing seats upon its upper and lower edges, so arranged that a single cutting disk and retention cap may be secured thereto so as to rotatably retain the cutting disk within the said bearing seats.

A further object is to provide a device of the character indicated in which a transverse slot is provided, to impart a certain degree of resiliency to the disk supporting portion of the structure thereby to increase the efficiency and enhance the utility of the disk.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferred embodiment of my invention is illustrated, in which:—

Figure 2:
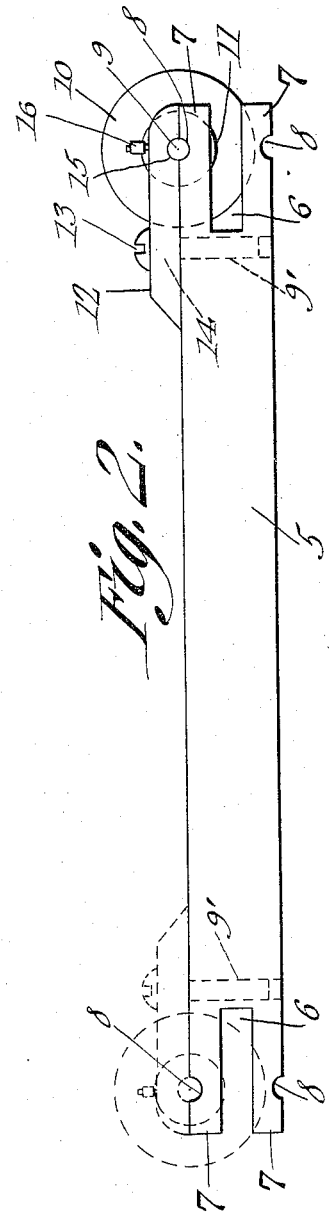
Figure 3:
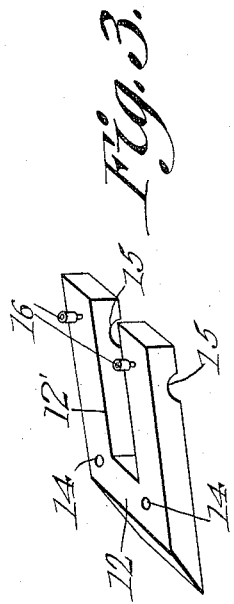

Figure 1 is a top plan view of my improved cutting tool. Fig. 2 is a side elevation thereof. Fig. 3 is a detail view in perspective of the disk holding cap.

Referring to the drawings in which similar reference numerals designate corresponding parts throughout the several views, a straight shank 5 of steel or similar material is provided and is equipped at its ends with transverse slots 6. The slotting of the ends at 6 defines upper and lower outwardly projecting prongs or disk carriers 7 which, due to their somewhat restricted dimensions, have a limited amount of resiliency. The shank 5 is also provided at its ends with longitudinally extending slots 6' which extend through the shank at right angles to the slots 6 and are equal in length thereto.

Extending transversely across the outer surfaces of the prongs 7 are semi-cylindrical grooves or bearings 8 which are adapted to receive and rotatably mount the trunnions 9 of a cutting disk 10. The cutting disk 10 includes circular faces 11 located adjacent the trunnions and adapted to contact with the inner walls of the prongs 7 and thus holds the cutter against shifting transversely. In order to hold the cutting disk 10 within the bearings 8, a cap as illustrated in Fig. 3 is employed and consists of a plate 12, having a slot 12' adapted to register with the slots 6' of the shank 5. The shank is provided with threaded apertures 9 extending therethrough and receiving holding screws 13. The holding screws 13 extend down through openings 14 within the cap 12 and are adapted to anchor the same to the shank 5. The screws 13 are tightened from time to time to allow for the wear of the trunnions 9 within the bearings 8. The under surface of the slotted plate 12 is provided with semi-cylindrical grooves or bearings 15 which with the grooves 8 of the prongs 7, define bearings for the rotatable reception and retention of the trunnions 9 of the cutting disk 10. Suitable oil cups 16 are mounted upon the cap 12 and provide for the smooth and continuous operation or rotation of the cutting disk 10.

From the foregoing, it will be apparent that the shank 5 may be used as a handle and that the entire tool may be manually operated to thus cut rubber, sheet brass, and other materials. However, the normal use of the tool occurs when the shank is placed with the carriage of a tool post and brought into contact with a rotating wheel to crease or cut grooves in the same. The transverse slots 6 afford a certain resiliency in the mounting of the disk 10 and thus insure its smooth and proper working, allowing the tool to compensate for irregularities which may occur in the wheel which is being creased. A single cap 12 is provided and the same may be secured to any pair of the prongs 7 for the attachment of a cutting disk thereto. The disk 10 may be replaced or sharpened from time to time. When one of the bearings 8 wears to such an extent that the set screws 13 are unable to bring the cap 12 into such position as to effect a proper bearing, the cap and cutting disk 10 are shifted to another pair of the prongs 7, which operation insures a long and serviceable life for the tool.

Having thus described my invention, what I claim is:—

A tool of the class described comprising a shank terminally provided with intersecting upright and transverse slots defining a pair of upper arms and a pair of lower arms and giving resiliency to both pairs of arms; a rotary cutter journaled on one pair of arms and adapted to be mounted on the other pair of arms when the shank is reversed; and means interchangeably mountable upon either pair of arms for holding the cutter thereon; the transverse slot being of sufficient width to permit one pair of arms to yield independently of the other pair of arms.

In testimony that I claim the foregoing as my own, I have hereto affixed my signature in the presence of two witnesses.

EDWARD E. RICE.

Witnesses:
JOHN E. NICKELS,
DOROTHY C. NICKELS.

Copies of this patent may be obtained for five cents each, by addressing the "Commissioner of Patents, Washington, D. C."